United States Patent Office 3,694,221
Patented Sept. 26, 1972

3,694,221
ENZYME MODIFIED PROTEIN PROCESS
Ralph A. Hoer, Ballwin, Christopher W. Frederiksen, St. Louis, and Robert L. Hawley, Webster Groves, Mo., assignors to Ralston Purina Company, St. Louis, Mo.
No Drawing. Continuation-in-part of application Ser. No. 625,980, Mar. 27, 1967. This application Jan. 30, 1970, Ser. No. 7,224
Int. Cl. A23j 1/14
U.S. Cl. 99—17
44 Claims

ABSTRACT OF THE DISCLOSURE

A method of preparing a vegetable protein product having excellent wettability in aqueous solutions and improved drop in and stir in characteristics is disclosed. The product exhibits a greatly improved texture, mouthfeel, and wettability over known materials and can be incorporated in a wide variety of food materials to form superior protein fortified foods. The process involves subjecting aqueous protein material to a rapid heating and physical working step, such as by steam injection, reacting the protein in the presence of a proteolytic enzyme for a short time to hydrolyze and modify the protein, and heating the protein to inactivate the enzyme and stop the reaction. The aqueous protein can be dried and a dry, powdered protein product is recovered which is highly dispersible in water, has high drop in and stir in characteristics, and which has excellent smooth texture and mouthfeel.

---

This application is a continuation-in-part of application Ser. No. 625,980 filed Mar. 27, 1967, now U.S. Pat. 3,642,490.

This invention relates to food, to the preparation of vegetable protein food products of controlled, high dispersibility and, more particularly, to a method of preparing a vegetable protein food and a soy protein food of high dispersibility, and food products made therefrom. The food products prepared by the process of this invention have improved drop in and stir in characteristics and exhibit an improved smooth texture and mouthfeel over previously known materials.

This invention was conceived and developed largely for soy materials because of the special problems encountered with such materials. Therefore, it will be explained largely with respect to soy materials and has special application to such materials, although it can be used for other protein materials in the broader aspects of the invention, for example, other oilseed materials, fish protein materials, or microbial protein products may be used.

The preparation of vegetable protein products by a variety of processes is known, including obtaining protein products from soy protein. Enzymatic processes for obtaining food materials from vegetable protein materials are also well-known; a typical process is disclosed in U.S. Pat. 2,232,052 granted to E. H. Cummins. The usual process employed in enzymatic processes requires a lengthy reaction time, typically several hours, and is conducted as a batch type operation. The process of this invention is a continuous type of operation which uses an enzymatic reaction to hydrolyze and modify the protein reactant within a short time, usually in seconds, or, at most, a few minutes, and which produces a product of unexpectedly superior functional properties.

SUMMARY OF THE INVENTION

The major object of this invention is to provide an enzymatic method of processing vegetable protein and particularly soybean protein materials to form a desirable edible protein product that has the high dispersibility necessary to be functional and has excellent smooth texture and mouthfeel. Another object is to obtain such a product which is also highly functional due to a controlled high dispersibility that enables excellent grade aqueous suspensions to be formed which exhibit excellent texture and mouthfeel. Hence, a resulting milk type product is smooth, not chalky, lumpy or granular. The method proceeds very rapidly and is substantially complete in a matter of minutes or even seconds. The resulting product can be used directly as a food and also will blend smoothly with products containing other flavorings without altering the character of the other flavorings.

Moreover, the novel soy treating process can be operated on an automated continuous flow basis, with a minimum of operating personnel and with a high production output rate.

The basic unique product obtained is one of excellent functionality. It is highly dispersible from a dry state and has exceptional drop in and stir in characteristics. It is treated with a process involving heat and enzymatic hydrolysis which proceeds substantially to completion in a matter of a few minutes. The product uniquely has an optimum combination of properties not obtainable heretofore in having a high dispersibility, e.g., of above about 80%, preferably above about 90% for a product formed from an isolated protein, a drop in rating of at least about 2 and a stir in above about 60%. Hence, it can be used as a food product in various forms, with high protein content. It also can be selectively added to a wide variety of other food products to effect special results, such as protein fortifiers which are added to aqueous solutions by the consumer. When added to cold milk the material of the invention exhibits excellent drop in and stir in characteristics and has extremely high total dispersibility. The mouthfeel of the milk mixture is excellent and it can provide a refreshing and nutritious drink, for example, of the instant breakfast type.

The novel process preferably treats the soy material as an aqueous slurry with controlled, rapid, dynamic heating to an elevated temperature range and with momentary physical working under dynamic conditions and under controlled positive pressure and elevated temperature conditions to expose and alter or modify the complex protein molecules. The so treated slurry may be retained for a brief controlled retention period at elevated temperature and under positive pressure. Then the undesirable substances may be removed by causing subsequent instant pressure release to cause flash off, with vaporizing of some moisture that is laden with the entrained substances, followed by separation of the vaporized materials from the slurry. The treated slurry is then subjected to a short enzymatic hydrolysis to hydrolyze and modify the protein material. The enzymatic treatment proceeds for from a few seconds to a few minutes and then the slurry is heated to inactivate the enzyme and stop the reaction. The slurry is then dried to an attractive light colored redispersible powder. The full nature and signifiance of the process and product will be understood upon studying the detailed description to follow.

DESCRIPTION OF PREFERRED EMBODIMENTS

As is well known, the interrelated chemical and physical characteristics of natural food substances are so extremely complex that very little is truly known or understood about them. Research into the behavior and nature of these characteristics and the changes caused in them under differing conditions and treatments is dependent almost entirely upon an empirical approach. Further, the acceptance of such materials by humans or animals, and the degree of usefulness of such by the human system or by animal systems is also predominantly experimental. This is true of naturally occurring vegetable protein materials such as soybeans, peanuts, safflower, cottonseeds, sesame seeds, and sunflower seeds, the most significant ones. Extensive research has been conducted on these in efforts to develop useful food products. As a result, some of these materials are presently being processed on a relatively limited basis to produce food products commonly called edible vegetable proteins.

A process of converting vegetable protein material into a product which has much broader application in the field of producing food materials than conventional processes is disclosed in copending U.S. patent application Ser. No. 625,980 filed Mar. 27, 1967, the parent application of this application. We have discovered that by modifying the process disclosed in that application a product can be produced which has even broader application in producing food materials. In particular, the product of this invention exhibits exceptional dispersibility in aqueous solution and unusual wettability. The improved character of the material is apparent in the drop in and stir in characteristics which the product exhibits. An additional result of the process is a product which has unusually fine smooth texture and mouthfeel when used in food products.

The process of this invention uses a slurried proteinaceous vegetable source as a starting material, preferably a soy isolate such as the material extracted by the method disclosed in copending application Ser. No. 625,980 is employed. The slurry first has its pH adjusted. This is important in order to make the slurried protein more susceptible to the heat and shearing action of the subsequent treatment. Specifically, the pH is adjusted to a range of about 5.7 to 7.5, preferably between about 6.5 and 7.1. The pH may be easily adjusted by adding a food grade alkaline reagent such as sodium bicarbonate.

The slurry to be further processed should have a controlled solids content of about 3% to 30% by weight, and preferably about 5% to 20% by weight. If it falls below about 3%, subsequent processing steps are not economically advisable when a continuous process is employed. Drying is particularly costly. Above about 20% solids content, the resulting product does not subsequently lend itself to the preferred flash drying techniques, such as spray drying using a jet or spinning thrower, so that other drying techniques must be employed, to result in a product that is not as desirable in its functional characteristics. Above about 30% solids content brownish discoloration of the product tends to occur during the processing.

Each tiny portion of this slurry is then subjected to dynamic instantaneous heating to an elevated temperature range while also being dynamically physically worked, preferably almost simultaneously. Currently, the most satisfactory way of achieving this is to pass the slurry through a device commonly known as a jet cooker. It includes adjacent jet nozzle orifices, normally concentric, through which the slurry and the pressurized steam used as a heating agent are ejected at high velocities in intersecting flow patterns, so that each tiny bit of slurry is instantly dynamically heated by the steam while practically simultaneously being subjected to severe physical forces at the nozzle, such physical working being largely of a shearing nature. This physical working and heating prepare the material for the subsequent processing steps by disrupting the protein molecule to open or expose the sites on the protein molecule to facilitate the subsequent enzymatic reaction. As a result of having the reactive sites on the protein molecules exposed to the activity of the enzymes, the enzymatic reaction proceeds extremely rapidly and produces a highly dispersible product in a very short time, typically within from about 15 seconds to ½ hour. A time of between about 5 and 15 minutes is preferred.

The temperature range to which the slurry is heated for the desired results is about 220° to 400° F., although the temperature should not be in the lower region of this range unless the product is subsequently vented into a vacuum chamber after being held under pressure in a special holding chamber, as explained hereinafter. Normally the temperature should be about 285° to 320° F. for best results. If higher temperatures than about 320° F. are used, the ultimate product may tend to develop a gelling nature. Temperatures above about 400° F. are normally not advisable because of process problems created and lower quality of resulting product.

The product is introduced to the jet cooker nozzle at a positive pressure. This pressure should be at a value near the pressure of the steam injected into the slurry, should be sufficient to cause high velocity discharge of the slurry through the jet nozzle, and must be greater than the pressure in the special retention chamber immediately downstream of the nozzle. Normally the steam pressure is about 80 to 85 p.s.i.g., the slurry line pressure is slightly above the steam pressure, usually about 85 to 100 p.s.i.g., and the discharge pressure in the chamber downstream of the nozzle is about 75 to 80 p.s.i.g. The pressure drop of the slurry across the nozzle is about 5 to 15 p.s.i., depending upon these other pressures, with 6 to 10 p.s.i. being common.

The time interval of the slurry in the nozzle is estimated to be less than one second. The nozzle orifice for the slurry is small, being only a fraction of an inch, e.g., about ⅛ inch, so that the slurry solids are subjected to severe dynamic, physical working during passage. The steam intermixes intimately with the solids in the ejected slurry. The amount of steam required is not great, normally being an amount to lower the solids content of the slurry about 1% to 2% by weight.

Preferably, the nozzle orifices are concentric, with the slurry being ejected from the center orifice, for example, and the steam from a surrounding annular orifice oriented to cause its output flow path to intersect the path of the center orifice. The slurry and steam could be ejected from the alternate orifices, however. Further, the adjacent orifices need not necessarily be concentric to obtain this interaction.

As noted previously, the steam and slurry may be ejected into a special retention chamber. This may comprise an elongated tube through which the intermixed slurry and steam moves from the jet nozzle on one end of the tube to a pressure controlled discharge on the other end. The discharge can be controlled by a conventional pre-set pressure release valve to enable continuous process flow from the nozzle to and out of the discharge valve. This valve regulates the pressure in the holding chamber. This chamber pressure must be great enough to prevent any significant vaporization of the moisture in the chamber, even though the temperature is well above the boiling point of water. A pressure of about 75 to 80 p.s.i.g. readily achieves the desired temperature of 310° F. Since slurry and steam must continuously flow into this pressurized chamber, the pressure behind the slurry and the steam must be greater than the chamber pressure to cause this continuous flow.

The heated slurry is retained in the holding chamber for a definite but relatively short time period of a few seconds up to a few minutes, normally of about 7 seconds to about 100 seconds. It is only necessary to retain the product in this heated condition for a few seconds for optimum product. The time is not too critical in this range.

The pressure on the slurry is then instantly released by discharging the slurry to a reduced pressure zone into a suitable receiving means. This causes "flash off" of a portion of the moisture in the form of water vapor which is laden with undesirable chemical components or substances of unknown composition from the soy product. The flash off also causes substantial cooling of the remaining slurry because of the heat of vaporization absorbed from the slurry, so that the total time which the product is subjected to elevated temperatures is very short and controlled. Removal of the vapors removes the undesirable components of the soy material.

Further, the product is usually completely sterilized by this treatment. Prior art processing techniques involved definite difficulties at elevated temperatures; as a result, sterilization never was complete or satisfactory. However, because of the substantially elevated temperatures here involved and the intimate mixture of the hot steam with the slurry, sterilization is substantially complete.

The reduced pressure zone into which the slurry is discharged is normally at atmospheric pressure, but it is sometimes subatmospheric, i.e., at a partial vacuum. In either case, the vapors should be instantly conducted away from the slurry, preferably by a moving current of air across the slurry or by drawing a continuous vacuum on the discharge zone to draw the vapors away. The vapors may be specially condensed in a fashion to positively remove the condensate from the area of the collected discharged slurry. In production, the slurry may be discharged from the back pressure control discharge valve directly into a vessel in the open atmosphere where the vapors are allowed and/or caused to rise directly away from the slurry and are prevented from condensing in a manner to allow the condensed substance to flow back into the product.

To assure complete removal of the vapors from the purified slurry without allowing the vapors to recondence back into the slurry, the slurry and vapor should be separated immediately after discharge, i.e., immediately after pressure release. In this regard it is undesirable to cause passage of both components through a common conduit downstream of the discharge valve, and if such is done, it should be minimal.

As noted, the most preferred method of physically exposing and thermally and physically releasing the objectionable substances from the protein molecular bundles for subsequent carry off and of exposing the sites on the protein molecule is by use of the jet cooker. It is conceivable that the intimate violent physical treatment to disrupt the protein bundles and expose these substances can be practiced by the use of other equipment such as, for example, by the shearing action of high pressure pumps, such as a colloid mill, by momentary heating in an elevated pressure zone prior to pressure release and flash off, or by combining shear and heat processing in other devices. The heating action on the subdivided protein bundles or the heating plus physical working can conceivably be achieved with alternate equipment such as a hot zone flow tube or coil. Such a device causes rapid flow through a constricted tube, one zone of which is exposed to a heat source such as a gas flame. Other alternative apparatus includes apparatus operating on magneto striction principles, apparatus employing radio frequency heating and agitation, electrostatic heating apparatus, supersonic wave devices, film diaphragm vibration equipment, and resojet resonating flame apparatus. In fact, one or more of these devices could be combined with the jet cooker to increase the physical working action.

After the protein material has been subjected to the violet shearing action and heating step in the jet cooker or another suitable device to prepare the protein material for the enzymatic reaction, the material is cooled to a temperature at which the enzymes will operate to promote the reaction of the protein. The exact temperature conditions of the material will depend on the particular enzyme employed. Generally, a temperature in the range of from 70 to 150° F. will be satisfactory. Cooling may be effected by the expansion and flashing off of vapors and gases in a vacuumizing step, by passing the slurry through a conventional heat exchanger, or by other conventional operations. The pH of the slurry is adjusted at this point, if necessary. Generally the pH adjustment made before processing by heat and shear is satisfactory; however, if the particular enzyme used requires a different pH level to operate satisfactorily, the pH is adjusted prior to addition of the enzyme. The enzymes suitable for use in this process may function over a wide pH range; depending on the type of enzyme employed a range of from about pH 6 to 10 may be used. Preferably, the pH is between about 6 and 7.5; at a pH above about 7.5 the protein may develop a soapy taste. When the protein slurry has reached the temperature and pH condition desired, the enzyme is metered into the system and the reaction proceeds. A variety of plant, bacterial and fungal enzyme materials have proven satisfactory for the process. A *Bacillus subtilis* material having both protease and amylase enzymes, obtained from the Monsanto Company of St. Louis under the trade name of Montase 110, has proven to be satisfactory, as have papain, bromelin, ficin and fungal protease. The enzyme material may be added at a preferred level of from 0.05 to 1.0% by weight of protein material (dry basis), depending on the temperature and time conditions employed, the activity of the enzymes, and the degree of hydrolysis desired. (Enzyme activity may be defined as the amount of enzyme required to produce a standard amount of Tyrosine from casein and maltose from starch under standard conditions.) Levels of enzyme above 1.0% may be used, but the cost becomes prohibitive for some enzyme materials. At levels below 0.05% the enzymatic reaction may proceed too slowly with some enzyme systems.

The reaction of the enzymes with the protein material begins immediately on addition of the enzyme material and can be carried to completion in between about 15 seconds and ½ hour. A time of between about 5 and 15 minutes is preferred. The protein slurry and enzyme reactant mass are typically passed through a holding system such as a holding tank or tube to provide a sufficient time lag for the reaction to proceed substantially to completion. When the enzymatic reaction has proceeded for a sufficient length of time, the reaction is stopped by heating the slurry to a temperature sufficient to inactivate the enzymes. Temperatures above about 180° F. are sufficient to inactivate the enzyme activity. The heating step can be accomplished by passing the reacted material through a heat exchanger, by repeating the jet cooking step, or by most conventional heating operations.

An additional unusual and unexpected benefit of the addition of enzymes to the protein slurry is a significant reduction in the viscosity of the slurry. Immediately on adding the enzymes to the protein slurry the viscosity drops sharply. The sudden drop is an indication that the desired enzymatic reaction is taking place. In addition, the lower viscosity of the resulting product is an indication that the slurried product has been reacted to the desired degree of hydrolysis or protein modification. The reduced viscosity of the enzyme treated slurry facilitates the further processing of the slurry. The treated slurry is less difficult to pump and process and further treatment is rendered more economical by reduction of pumping costs and by facilitating operation at a higher solids content.

The resulting slurried product can then be used directly for food products. It is an attractive light colored product If the pH prior to treatment was within the stated range, the slurry contains most of the material in a partially dissolved state and a partially dispersed colloidal state that does not tend to settle out. Alternatively it can be dried, with the dried product having excellent redispersibility in an aqueous medium with superior drop in and stir in characteristics.

If the slurry is dried, it is preferably flash dried because of the uniform, fine, powdered product obtained, the economical continuous processing afforded thereby, and the excellent redispersion characteristics of the powder. Of the flash drying techniques, spray drying is usually used. The product may be freeze dried, but this is more costly. However, if the solids content of the slurry is above about 20% flash drying becomes difficult or impossible. Then, other drying techniques such as drum drying, tray drying, or the like must be employed, but the dried product tends to be somewhat lumpy.

The dried powder is capable of rapid simple rehydration to a suspension simply by adding water and stirring, because of its high redispersion capacity. The product may be used as a substitute for dairy product derivatives, even dried skim milk, for a variety of purposes. The product will normally have a drop in rating of at least 2 and a stir in rating of at least 60%. Preferably, the drop in rating will be at least 3 and the stir in will be at least 70%. The total dispersibility of the product is quite high, usually above about 90% for products formed from isolated protein, due to the increased wettability of the product. A range of about 92.5 to 97.5% DPI is typical for an isolated protein material which has been treated by the method of the invention. Protein materials which have not been isolated to their pure form also have their dispersibility significantly improved by the process of the invention, however, the total dispersibility of the impure protein materials may not be as high as for isolated protein materials which have been subjected to the method of the invention. The product has excellent smooth texture and mouthfeel; it is not grainy or slimy. The product stays in suspension well and does not tend to settle out at the bottom of the container when mixed in an aqueous suspension.

Although the inventive concepts will be readily understood from the foregoing description by one having ordinary skill in this art, the following illustrative examples are given to assure a complete understanding.

EXAMPLE 1

(A) Soybeans are crushed, flaked and the oil extracted with hexane to give flakes commonly called soybean meal. The flakes are added to an aqueous bath and a food grade alkaline reagent, sodium hydroxide, is added until a pH of 10 is reached. The material is extracted for 30 minutes and then centrifuged. The soy protein material is precipitated from the liquor by adding hydrochloric acid until the isoelectric point is reached at about a pH of 4.7. The precipitate is washed with water and then added to water to make an aqueous slurry of 15% solids by weight.

(B) The pH is then adjusted to 6.8 by adding sodium bicarbonate.

(C) The slurry is then passed through a jet cooker under a pressure of 85 p.s.i.g. simultaneously with steam ejection from the jet cooker under a pressure of 95 p.s.i.g. into a pressure retention chamber at a pressure of 75 p.s.i.g. The steam heats the slurry through the jet cooker to a temperature of 290° F. After 7 seconds progressive portions of the heated slurry are suddenly discharged into a receiver at atmospheric pressure or below, causing flash off of vapors laden with undesirable substances. The slurry is cooled by the flash off vaporization. The substance laden vapors are removed from the purified slurry.

(D) When the slurry temperature reaches 125° F. (the pH of the material is 6.5) an aqueous solution of Montase 110 enzyme having a solids content of 20% by weight and a casein activity level of 2.07 is added to the slurry. The enzyme is added at a level of 0.15% by weight of protein (dry basis). The enzyme treated slurry is allowed to react for two minutes. The viscosity of the slurry begins to drop imediately on addition of the enzyme solution.

(E) The reaction of the enzymes is stopped by repeating Step C to inactivate the enzymes by heat.

(F) The slurry is flash dried in a spray drier to a moisture content of about 3% by weight. The dispersibility of the product obtained is 97.5% DPI. The product had a drop in rating of 3.0 and a stir in rating of 70% by weight.

EXAMPLE 2

The Steps A and B in Example 1 are followed, but in Step C the slurry is heated to 260° F., held in the retention chamber for 15 seconds, and ejected into a vacuum chamber at a pressure of about 5 p.s.i. The slurry is cooled to 130° F. (the pH of the material is 6.5), and the protein reacted with papain enzyme at a level of 0.75% by weight of protein for 7 minutes. Steps E and F of Example 1 are repeated. The dispersibility of the product obtained is 79.0% DPI. The product had a drop in rating of 1.5 and a stir in rating of 50% by weight.

EXAMPLE 3

The Step A in Example 1 is followed by adjusting the pH in Step B to 6.9. In Step C the slurry, when passed through the jet cooker, is heated to a temperature of 340° F. and retained for 30 seconds under pressure before discharging. The slurry is cooled to 125° F. and a pH of 6.5. The protein is reacted for 60 seconds with Montase 110 enzyme of activity 1.0 at a level of .43% of solids. Steps E and F of Example 1 are repeated with a temperature of 180° F. used to inactivate the enzyme. The dispersibility of the product obtained is 87.9% DPI. The product had a drop in rating of 2.0 and a stir in rating of 70% by weight.

EXAMPLE 4

The Steps A and B of Example 1 are performed, except that the pH is Step B is 7.1. Then the slurry is passed through a high pressure pump and put under pressure of several hundred p.s.i., then passed through a four coil indirect heat exchanger and rapidly heated to a temperature of 308° F. and held under pressure for 30 seconds. The slurry is cooled to 130° F. (the pH of the material is 6.9), and the protein reacted for two minutes with Montase 110 enzyme of activity 1.0 at a level of .3% of protein solids. The enzyme is inactivated by heating the slurry to 180° F. by the method of Step C of Example 1. The product is then freeze dried. The dispersibility of the product obtained is 90% DPI. The product had a drop in rating of 2.0 and a stir in rating of 60% by weight.

EXAMPLE 5

Fifty percent solvent extracted soybean meal was slurried with water to form an aqueous slurry having 15% solids by weight. The soybean meal had a dispersibility of 31.8% DPI and a pH of 6.9. The slurry was processed as described in Step C of Example 1, except the material was heated to 310° F. and retained under pressure for 30 seconds before discharging to lower pressure. The slurry was cooled to 130° F. and the pH of the cooled slurry was 6.7 The cooled slurry was reacted for 7½ minutes with Montase 110 enzyme of activity 1.0 at a level of .36% of solids. Steps E and F of Example 1 were repeated to inactivate the enzyme with a temperature of 310° F. being used in the jet cooker to inactivate the enzyme. The dispersibility of the final product was 83.5% DPI.

EXAMPLE 6

Fifty percent meat and bone meal having a protein content of about 50% by weight was slurried with water to form an aqueous slurry having 15% solids by weight. The meat and bone meal had a dispersibility of 8.3 DPI and a pH of 6.9. The slurry was processed as described in Step C of Example 1, except the material was heated to 310° F. and retained under pressure for 30 seconds before discharging to lower pressure. The slurry was cooled to 130° F. and the pH of the cooled slurry was 6.7. The cooled slurry was reacted for 7½ minutes with Montase 110 enzyme of activity 1.0 at a level of .7% solids. Steps E and F of Example 1 were repeated to inactivate the enzyme with a temperture of 310° F. being used in the jet cooker to inactivate the enzyme. The dispersibility of the final product was 80.7% DPI.

EXAMPLE 7

Fifty percent solvent extracted peanut meal was slurried with water to form an aqueous slurry having 15% solids by weight. The peanut meal had a dispersibility of 47.5 DPI and a pH of 6.9. The slurry was processed as described in Step C of Example 1, except the material was heated to 310° F. and retained under pressure for 30 seconds before discharging to lower pressure. The slurry was cooled to 130° F. and the pH of the cooled slurry was 6.7. The cooled slurry was reacted for 7½ minutes with Montase 110 enzyme of activity 1.0 at a level of .3% of solids. Steps E and F of Example 1 were repeated to inactivate the enzyme with a temperature of 310° F. being used in the jet cooker to inactivate the enzyme. The dispersibility of the final product was 89.7% DPI.

Hundreds of other examples could be given but would only unduly lengthen this description.

The functional characteristics of the novel product includes capacity to serve well as a water and fat binder in the slurry for homogenous dispersion thereof rather than separation. This facilitates its utility in many products as a direct substitute for dairy products. It further has excellent utility as a low calorie, high protein food. The protein content can be varied greatly, depending upon whether other components such as sugars, fiber, etc. are initially removed, by adding controlled amounts of isolated soy protein (about 90% or greater protein) to the slurry prior to the physical and thermal processing steps or the like.

Since the product can be used in a liquid slurry form with an edible liquid carrier such as water, which dissolves a share of the protein and holds the remainder in a finely divided suspension, it is useful for high protein beverages of various types, as liquid protein additives to food products, or as a thickener. The product can also be used in powder or flake form as a cereal, as an additive to increase food protein content of such foods as spaghetti and macaroni, as a thickener for foods, and as a protein supplement as for meat or imitation meats. It could be employed as the basic ingredient of puddings, as additives to bakery products such as cakes, cookies and bread. The novel product in a powder form can be converted to a paste which forms a high protein food spread of selected flavors.

A particularly valuable property of this novel product is its high wettability and its advantageous drop in and stir in characteristics. The product is evaluated on a scale where 0—no drop in
1—slight product drop in (slightly cloudy)
2—moderate product drop in
3—good product drop in (cloudy solution)
4—superior product drop in (very cloudy solution)
5—excellent product drop in (at least 50% of the product has dropped in)

by spreading five grams of the product on the surface of 200 ml. of water at 30° C. in a 400 ml. beaker and observing the amount of protein which has dropped into solution after one minute. The process of this invention provides a product which has a drop in range of at least about 2 and preferably at least about 3. After the solution has stood for one minute it is stirred with a spoon for 30 seconds and the percent of product stirred in solution is analyzed. The product of this invention has a stir in of at least about 60% and preferably at least about 70%. Due to the high dispersibility and wettability of the product it will remain in a cold aqueous solution and will not settle out appreciably. These characteristics—high drop in, high stir in and high dispersibility—render the product extremely useful in a number of protein products, such as protein fortified drinks where the protein is mixed in a cold aqueous base by the consumer. A typical product would be of the instant breakfast type where the consumer adds the protein fortifier to cold milk and mixes the materials by stirring. In products of the instant breakfast type the product of the invention provides a superior protein additive due to its excellent functional characteristics and its superior smooth texture and mouthfeel in the resulting solution.

EXAMPLE 8

A typical instant breakfast type drink product can be prepared by adding 22.44 parts sucrose
15.89 parts dextrose
15.39 parts of the material produced in Example 1
.34 part vanilla flavor
.20 part salt
.05 part vanillin
.05 part maltol to a container and mixing for two minutes while spraying one part of propylene glycol into the mixer. The material is mixed for an additional 15 minutes and 44.64 parts of instant nonfat dry milk are added to the mixer and mixed for three minutes. The combined materials provide an excellent instant breakfast product. If the combined materials are mixed with 8 ounces of cold milk and stirred, the solid constituents are dispersed in the aqueous phase within about 5 to 10 seconds and a refreshing, nutritious drink is produced. The dispersed material remains in the aqueous phase and does not float or settle out of the dispersion.

The product of the invention can also be in the form of a semi-gelled or totally gelled product useful in high protein, low calorie desserts, thickeners, candies, or imitation fruits of various types.

Additional food items formable by the product per se or as an additive include coffee whiteners, spun protein fiber, in ice cream or as simulated ice cream, candy, pie crusts, crackers, chocolate, in butter and oleomargarine, snack dips, snack chips, sauces, e.g., white, cheese and hollandaise, as meat extenders as in sausage, in pie fillings, in frozen desserts, whip toppings and marshmallows. Present experimentation is resulting in many other unique applications of the novel vegetable protein, non-dairy, negligible calorie food products. The novel product can also be added to dairy products in various special ways to achieve totally new food products.

In view of the basic significance of this invention and the breakthrough it creates in vegetable protein food technology, it is considered that the invention is not to be specifically limited to the disclosure details, but is to be defined by the scope of the appended claims and all reasonable equivalents.

We claim:

1. A process of treating soybean meal from which the oil has been extracted to obtain a food product having high dispersibility, comprising the steps of: separating the soy protein from the other major components of the meal; forming an aqueous slurry of the separated soy protein; adjusting the pH of the slurry to within the range of about 5.7 to 7.5; dynamically working the protein molecules and heating the slurry under pressure for a short time to expose the reactive sites on the protein molecules; releasing the pressure to volatilize water vapor from the heating slurry and cool it; and rapidly reacting the cooled slurry with an enzyme for a short period of time to hydrolyze and modify the protein to produce a soy product which exhibits high dispersibility and improved texture and mouthfeel when used as a food product.

2. The process in claim 1 wherein said disrupting is achieved by injecting steam into said slurry under pressure on a continuous flow basis as said slurry is ejected under pressure at a high velocity from a restricted passage.

3. The process of claim 1 wherein the enzyme is added in proportions of between about .05 to 1.0% by weight of the protein on a dry basis.

4. The process of claim 1 wherein the enzyme is a mixture of protease and amylase enzymes.

5. The process in claim 1 wherein said temperature is about 220° to 400° F.

6. The process in claim 1 wherein said temperature is about 285° to 320° F.

7. The process of claim 1 wherein the pH of the protein material is adjusted to between about 6 and 10 prior to reaction with the enzyme.

8. The process in claim 1 wherein said aqueous slurry has a solids content of about 3% to 30% by weight.

9. The process in claim 1 wherein said aqueous slurry has a solids content of 5% to 20% by weight.

10. The process in claim 9 including the step of flash drying the purified product slurry to a fine light colored powder having high redispersibility.

11. A process of treating soy protein containing material comprising the steps of: forming a slurry of soy protein containing material and adjusting the pH of the slurry to within the range of about 5.7 to 7.5; practically instantly heating successive portions of the slurry to a temperature substantially above 220° F., on a continuous basis while physically working it under dynamic flow conditions; rapidly cooling the slurry; and reacting the cooled soy protein with an enzyme for a short period of time to hydrolyze and modify the protein material to produce a soy product which exhibits high dispersibility and improved texture and mouthfeel when used as a food product.

12. The process in claim 11 wherein said temperature is about 285° to 320° F.

13. The process of claim 11 wherein the enzyme is selected from the group consisting of plant enzymes, bacterial enzymes, fungal enzymes and mixtures thereof.

14. The process of claim 11 wherein the enzyme selected exhibits both proteolytic and amylolytic activity.

15. A process of treating soy protein material separated from soybean comprising the steps of: passing successive portions of an aqueous slurry of soy protein having a pH of between about 5.7 to 7.5 under pressure and at a high velocity through restricted orifice means into a pressure chamber while injecting pressurized steam intimately into the slurry at said orifice means to substantially instantly heat the slurry to temperatures substantially above the boiling point of water and to cause dynamic physical working of the slurry because of the dynamic flow conditions; maintaining said heated slurry for several seconds in said pressure chamber under a pressure sufficient to prevent volatilization of water vapor from the heated slurry; then advancing successive portions of the slurry from said pressure chamber to a low pressure zone to instantly release the pressure on said successive portions, causing cooling of the slurry; reacting the cooled protein material with an enzyme for a short period of time to hyldrolyze and modify the protein material to produce a soy product which exhibits high dispersibility above about 80%, a drop in rating of at least about 2, a stir in rating above about 60%, and improved texture and mouthfeel when used as a food product; and drying the slurry.

16. The process in claim 15 wherein said temperature is about 220° to 320° F.

17. The process of claim 15 wherein the enzyme is selected from the group consisting of papain, ficin, bromelin and bacillus subtilis enzymes.

18. The process in claim 15 including the step of spray drying said soy protein product to a light colored powder.

19. The process in claim 15 including the step of spray drying said soy protein product to a light powder state.

20. A process of treating protein containing material to obtain a product with high disperisibility, comprising the steps of: preparing an aqueous slurry of protein containing material; adjusting the pH of the slurry to within the range of about 5.7 to about 7.5; heating the slurry rapidly and dynamically to elevated temperatures above about 220° F., and subjecting it to dynamic physical working; retaining the slurry for a brief period of time under a positive pressure sufficiently high to prevent volatilization of heated water vapor from the heated slurry; and then suddenly releasing the pressure to cool the slurry and cause flash off volatilization from the slurry of water vapor; rapidly reacting the cooled slurry with an enzyme to hydrolyze and modify the protein material; and heating the reacted slurry to inactivate the enzyme and stop the reaction of the enzyme with the protein to thereby obtain a protein product which exhibits high dispersibility, drop in, stir in, and which exhibits improved texture and mouthfeel when used as a food product.

21. The process in claim 20 wherein said temperature is about 220° to 400° F.

22. The process in claim 20 wherein said temperature is about 285° to 320° F.

23. The process in claim 20 wherein the temperature of the slurry is practically instantly heated to a temperature of about 285° to 320° F. in a fraction of a second, and held at that temperature for several seconds before pressure release, and then is lowered to below 150° F.

24. The process in claim 20 wherein said aqueous slurry has a solids content of about 3% to 30% by weight.

25. The process in claim20 wherein said aqueous slurry has a solids content of 5% to 20% by weight.

26. The process in claim 20 wherein said pH range is 6.5 to 7.1.

27. A process of treating soybean meal from which the oil has been extracted, to obtain a bland flavored soy protein product having high dispersibility comprising the steps of: separating the soy protein from the other major components of the meal, and forming an aqueous slurry of the soy protein material; flash drying the slurry to form a soy protein powder; forming a fresh aqueous slurry from the powder; adjusting the pH of said fresh aqueous slurry to a range between about 5.7 and 7.5; heating the fresh slurry rapidly and dynamically to elevated temperatures of about 285° to 320° F. and momentarily subjecting it to dynamic physical working; votalizing objectionable flavors cooling the slurry to a temperature of between about 70 and 150° F., and reacting the protein material with an enzyme to modify the protein material to produce a soy product which exhibits high dispersibility above about 90% and improved texture and mouthfeel when used in a food product.

28. The process in claim 27 wherein the temperature of the slurry is practically instantly heated to a temperature of about 285° to 320° F. in a fraction of a second, and held at that temperature for at least a few seconds, and then is rapidly lowered to below 180° F.

29. The process in claim 27 wherein said fresh aqueous slurry has a solids content of about 3% to 30% by weight.

30. The process of claim 27 wherein said fresh aqueous slurry has a solids content of 5% to 20% by weight.

31. The process in claim 30 wherein said soy protein product is flash dried to a light colored, highly redispersible powder.

32. The process in claim 27 wherein said heating is achieved by injecting steam into said slurry under pressure on a continuous flow basis as said slurry is ejected under pressure at a high velocity from a restricted passage.

33. A process of treating soy protein containing materials to remove objectionable flavor characteristics while effectuating highly functional properties in the final product comprising the steps of: preparing an aqueous slurry of soy protein containing materials having a pH of between about 5.7 to 7.5; dynamically physically working said materials to break up the protein bundles and rapidly elevating the temperature of said slurry above 220° F. to expose the sites of the protein molecules to the activity of enzyme materials; volatilizing and removing the objectionable flavor characteristics; cooling the protein materials to a temperature at which enzymatic activity can proceed; adding an enzyme material to the cooled protein material and rapidly reacting the protein with the enzyme to hydrolyze and modify the protein material to produce a product which exhibits high dispersibility.

34. The process of claim 33 wherein the enzyme is inactivated after the protein material is modified.

35. A process of treating vegetable protein material to obtain a food product comprising the steps of: preparing an aquous slurry of the vegetable protein material having a pH of between about 5.7 to 7.5; heating the slurry rapidly and dynamically to elevated temperatures above about 220° F., and momentarily subjecting it to dynamic physical working; retaining the slurry for a brief period of time under a positive pressure sufficiently high to prevent volatilization of heated water vapor from the heated slurry; then suddenly releasing the pressure to cause flash cooling of the heated slurry; and then reacting the cooled protein material for between about 15 seconds and 30 minutes with an enzyme material to produce a product having high dispersibility.

36. The process in claim 35 wherein said steam and slurry are ejected intimately intermixed into a pressure chamber where it is held under pressure for a short but definite time period of at least a few seconds, prior to pressure release.

37. The process in claim 35 wherein the protein material is reacted with enzyme for between about 5 to 15 minutes.

38. The process in claim 35 wherein said temperature is about 285° to 320° F.

39. The process in claim 35 wherein said aqueous slurry has a solids content of about 3% to 30% by weight.

40. The process in claim 35 wherein said aqueous slurry has a solids content of 5% to 20% by weight.

41. The process of claim 35 wherein the enzyme is selected from the group consisting of plant enzymes, bacterial enzymes, fungal enzymes and mixtures thereof.

42. The process of claim 41 wherein the enzyme selected exhibits both proteolytic and amylolytic activity.

43. The process of claim 41 wherein the enzyme is selected from the group consisting of papain, ficin, bromelin and *Bacillus subtilis* enzymes.

44. The process of claim 41 wherein the pH of the cooled slurry is adjusted to between about 6 and 7.5 prior to reacting the protein material with the enzyme.

References Cited

UNITED STATES PATENTS 3,303,182   2/1967   Sakai et al. _____ 260—123.5

OTHER REFERENCES

Ziemba, Lot Saz Proteins Work Wonders for You, Food Engineering, May 1966, vol. 38, pp. 82–84, 87–90, 93.

RAYMOND N. JONES, Primary Examiner

W. A. SIMONS, Assistant Examiner

U.S. Cl. X.R.

260—123.5